Patented July 2, 1940

2,206,470

UNITED STATES PATENT OFFICE 2,206,470

WEED DESTROYING PREPARATION

Wellington Lee Tanner, Panasoffkee, Fla., and Clifford A. Parish, Chicago, Ill.

No Drawing. Application September 17, 1937, Serial No. 164,420

2 Claims. (Cl. 167—45)

Our invention relates to materials or preparations for destroying weeds and noxious plants along railroad rights of way and other places where the ground is desired to be free of vegetation, and our main object is to provide a novel substance or preparation which not only has a toxic or destructive effect upon the weeds, but also renders them disagreeable or repulsive to the taste of animals attempting to eat the treated weeds, whereby to save such animals from becoming poisoned.

A further object of the invention is to provide a material which administers an oily and slowly volatile coating with the poison, such coating having properties which are disagreeable and repulsive to the taste and the further advantage of retaining such properties until the weeds have become destroyed by the poison.

A still further object of the invention is to provide a substance for the treatment of vegetation along railroad rights of way which has a content of moisture or dampness in its structure by virtue of a slowly volatile oil contained therein, so that when the substance is spread to reach the rails and ties of the railroad equipment, it will act as a protective coating against corrosion and decomposition from the effects of the weather.

Another object of the invention is to provide a material for the purposes outlined which may be produced at low cost, maintained in a stable condition and applied without special equipment.

An additional object of the invention is to provide an oily ingredient in the novel preparation which has dust-laying properties when the preparation procures the disintegration of the vegetable substance so that the dust therefrom is prevented from rising or scattering along the adjoining areas.

The destruction of weeds and noxious vegetation by chemicals has been primarily recognized as an efficient method. However, where the areas under treatment have been accessible to cows and other animals from farms or homesteads nearby, the beneficial results of the treatment have been offset frequently by the poisoning of the animals who attempt to eat the treated vegetation. Commonly the latter is sprayed with an arsenic solution, which has a toxic effect and causes the wilting, shriveling and eventual collapse of the vegetation. However, despite its poisonous nature, the solution seems not to be distasteful to the animals attempting to eat the vegetation, having in fact a salty tang which acts as a lure to continue the consumption of the vegetation. The illness and loss of useful animals through this circumstance has discouraged an otherwise efficient method of weed destruction, and we have therefore devised the novel weed destroying material with a content to render it safe to animal life.

In accordance with the foregoing, we employ the conventional poison ingredient in our preparation, namely a salt of arsenic such as sodium arsenite or sodium arsenate, or a combination of these substances. A typical formula for the preparation is the following:

| | Pounds |
|---|---|
| Sodium arsenite (or mixed with arsenate) | 100 |
| Sodium caseinate | 15 |
| Fuel oil | 85 |

The arsenic salt is in finely-granulated or pulverized form. The caseinate is mixed with the oil and acts as a solidifying agent or carrier therefor. The oil-treated caseinate is then commingled with the arsenic salt and sifted if necessary to have a free-running constituency. The product so obtained is then sprayed or scattered by hand or machine means to dust or coat the unwanted vegetation.

The coating, while primarily lethal in effect, presents a moist or damp surface, owing to the oily caseinate particles mixed into the arsenate salt. As the oil is slowly volatile, it is retained on the surface of the vegetation while the destructive action of the arsenic salt ensues. Thus, animals attempting to eat the vegetation encounter the disagreeable fuel-oil taste and withdraw, escaping the poisonous substance. We have tested the repellent property of the preparation in respect to animals by extended experiments and found them to consistently dislike weeds treated with our preparation.

As to the above formula, the amounts of the ingredients are merely typical, and they may be varied for best results or to suit conditions or dispensing equipment, it sufficing that the particles of the powder or dust have had contact with a film of the fuel oil. Thus, the material need not be moist or damp to have the oily taste; in fact it may be fairly dry when dispensed, but will absorb sufficient moisture from the air or the surface of the vegetation to become damp and so acquire a tendency to retard the evaporation of the oil content.

On the other hand, if it is desirable, the oil in larger quantity may be chosen as the vehicle for the arsenic salt, in which event the caseinate may be dispensed with and the preparation assumes the form of a liquid, to be applied by spraying. In either case, the use of the preparation on the roadbeds of railroads lends the additional advantage of depositing a coating on the rail bases and plates to save them from corrosion and on the ties to protect them from decay. Also, when the vegetation becomes dried and disintegrated from the process of destruction, the damp coating formed by the novel preparation serves to lay the dust and keep it from being blown on the roadbed and in other directions by the wind.

In conclusion, it will be evident that the new preparation presents a weed-killing medium which is not a menace to animal life, providing a simple method for spoiling the taste of the animals for the treated vegetation.

We claim:

1. A weed destroying preparation comprising a quantity of a powdered arsenic salt, and an equal quantity of a sifted solid containing a small quantity of a caseinate salt and a much larger quantity of a hydrocarbon oil.

2. A weed destroying preparation comprising a quantity of sodium arsenite, and an equal quantity of a sifted solid containing by weight 15 parts of sodium caseinate and 85 parts of hydrocarbon oil.

WELLINGTON LEE TANNER.
CLIFFORD A. PARISH.